(12) United States Patent
De Smet

(10) Patent No.: US 7,287,021 B2
(45) Date of Patent: Oct. 23, 2007

(54) METHOD FOR SEARCHING INFORMATION ON INTERNET

(76) Inventor: Francis De Smet, Generaal Lemanlaan 151b., 8310 Assebroek. (BE)

( * ) Notice: Subject to any disclaimer, the term of this patent is extended or adjusted under 35 U.S.C. 154(b) by 360 days.

(21) Appl. No.: 09/922,811

(22) Filed: Aug. 7, 2001

(65) Prior Publication Data

US 2002/0140715 A1    Oct. 3, 2002

(30) Foreign Application Priority Data

Aug. 7, 2000   (BE) .................................. 2000/0496

(51) Int. Cl.
    *G06F 17/30* (2006.01)
(52) U.S. Cl. .................... 707/3; 707/4; 707/5; 707/6; 707/102; 707/10; 707/104.1
(58) Field of Classification Search .................... 707/1, 707/3, 10, 200, 5, 6, 104.1, 102; 709/200, 709/206, 205, 202; 705/26, 27; 379/265.05
    See application file for complete search history.

(56) References Cited

U.S. PATENT DOCUMENTS

| | | | |
|---|---|---|---|
| 5,594,791 A * | 1/1997 | Szlam et al. ........... 379/265.09 |
| 5,898,594 A * | 4/1999 | Leason et al. .............. 700/231 |
| 6,326,962 B1 * | 12/2001 | Szabo .......................... 715/762 |
| 6,366,906 B1 * | 4/2002 | Hoffman ........................ 707/3 |
| 6,377,944 B1 * | 4/2002 | Busey et al. ................... 707/3 |
| 6,393,423 B1 * | 5/2002 | Goedken ...................... 707/10 |
| 6,405,175 B1 * | 6/2002 | Ng .............................. 705/14 |
| 6,405,206 B1 * | 6/2002 | Kayahara ................... 707/102 |
| 6,453,038 B1 * | 9/2002 | McFarlane et al. ..... 379/265.05 |
| 6,487,553 B1 * | 11/2002 | Emens et al. .................. 707/5 |
| 6,493,695 B1 * | 12/2002 | Pickering et al. ............. 706/47 |
| 6,539,080 B1 * | 3/2003 | Bruce et al. ............. 379/88.17 |

OTHER PUBLICATIONS

Barbara Quint, Inside a searcher's Mind: The seven Stages of an Online Search-Part 1, May 1991, v15, n3 p13 (6), pp. 1-8.*

* cited by examiner

*Primary Examiner*—Cam-Y Truong
(74) *Attorney, Agent, or Firm*—Bacon & Thomas, PLLC

(57) ABSTRACT

A method for searching information on the Internet that includes the steps of providing a computer linked to the Internet, and accessing a search assistant via the Internet to search information on the Internet. The search assistant is a human being and a specialist in searching on the Internet. The human search assistant reformulates a first information request of the user into an adapted information request associated with the first information request and applies the adapted information request on a search robot for accessing information related to the first information request.

12 Claims, 7 Drawing Sheets

METHOD FOR SEARCHING INFORMATION ON INTERNET

BACKGROUND OF THE INVENTION

1. Technical Field

The present invention relates to a method for searching information which is available on the World Wide Web, called internet.

2. Description of the Related Art

The internet is a worldwide network comprising more and more information each day. According to the philosophy of the internet, this growing flow of information actually is controlled and regulated by nobody, and there are no intermediaries.

The consequence thereof is that nobody can obtain a survey of the growing flow of information which is presented on the internet.

If one wants to search certain information and does not know the right place where the information is located, then one may recur to a so-called search robot, this is a search program which can scour the internet in search of the requested information, but a disadvantage connected to this search robot consists in that it searches only in a part of all the present information, such in the part of which the search robot has made an index. In consideration of the fact that the information on the internet is growing day by day, the index of the search robot always is outdated.

Moreover, the result of a search action performed by a search robot comprises a lot of redundant information which scarcely has anything to do with the submitted request, which is caused by the fact that a search engine actually is very stupid and does not understand relations and terms which seem very simple to us. For the search robot, the question must be posed very accurately in order to obtain useful results.

Moreover, it is mostly so that the person looking for information only looks at the first search results of the search robot, and therefore only the best-positioned search results are used.

In case that there are not many links to a well-defined internet site, it will also be difficult for the search robot to find the information concerned. Therefore, a high number of links coupled to an internet site increases the possibility of success during searching, as the information can be obtained in several ways.

An additional problem is that there are many data bases which are concealed behind a certain internet address and in which the search engine can not start searching directly. First, one has to log in on the data base concerned before it can be consulted. Thus, one first has to know all present data bases which one possibly may consult.

There are already search robots which are directed towards very specific thematic fields, however, the disadvantage thereof is that, due to the limited field of knowledge thereof, one can not rely thereon for search tasks not situated within that field of knowledge.

Further, one may consult so-called web catalogues or directories, but these have the disadvantage that they do not remain up-to-date and that the quality thereof depends on the editor. If one has no keywords for very special terms or fields, the search only makes sense for a limited field.

U.S. Pat. No. 5,958,014 discloses a method for establishing a data connection between a computer and a live agent selected from an agent pool. An agent queuing manager receives the request of a user and selects an appropriate live agent from the pool. These agents are specialists in their technical domain and give advice to the user in their domain. These agents are no specialists in searching on the internet and are not using search engines.

U.S. Pat. No. 5,563,805 discloses a method for providing assistance to a user in a distributed area processing system. This assistance also is not related to searching information on internet.

U.S. Pat. No. 6,223,165 discloses a method using a server unit which can store and display the names and characteristics of experts and assist in connecting an expert and a customer for real-time communication. The server can tell the customer how to contact an expert and shows for instance a list of available experts on the PC of the customer.

SUMMARY OF THE INVENTION

Thus, the present invention aims at remedying the above-mentioned disadvantages by providing a method which renders the search for information by a user on the internet easier and more reliable.

This aim is achieved by a method in which at least one human search assistant is used who will assist a user in searching for information on the internet, whereby this human search assistant is a specialist in searching on the internet.

The human or live search assistant is in the first place an expert in searching on the internet and assists the user by searching on internet and indicating to the user where the information he is looking for can be found in the World Wide Web or where the user should be looking in the World Wide Web or giving the requested information gathered in the internet.

The human search assistant may have such expertise in searching on the internet that he can be considered as a web librarian, able to give more information than the place to look on the World Wide Web and able to supervise the user consulting the internet.

When assisting, the human search assistant preferably makes use of search engines for searching on internet.

The human search assistant is working interactive and in real time.

The user communicates with this human search assistant by voice via the internet, preferably by means of voice recognition technology. The human search assistant may also use the search engines by the intermediary of such voice recognition technology, eventually with SOFIA (sophisticated intelligent agents).

This human search assistant can be consulted in different manners, for example, by means of a personal computer, a mobile phone, a NAK, this is a mobile phone with an extra large display, a palmtop or an interactive television apparatus or the set-top box associated therewith.

The human search assistant can be shown by means of a digital camera, such that the user is in visual contact therewith.

Several human search assistants may operate on one internet site. By means of voice recognition, iris recognition or fingerprint recognition, the user always can get automatically into contact with the same human search assistant of his choice, such that the relation between the human search assistant and the user is personalized.

In the case of several human search assistants, one or more head search assistants can be present having a number of specialized adjunct search assistants below them who each can be specialized in one or more fields, whereby a head search assistant directs the call which he receives towards one of these specialized adjunct search assistants.

In that the human search assistant is a person who can reason and can understand emotions, which a computer program can not, it is easier for the user to explain his wishes. The human search assistant can put the wishes of the user into a certain perspective and, on the basis of his experience, can translate these wishes into an information request which is very good adapted for searching by means of search robots.

The human search assistant also may offer other services to the user, such as, for example, attending for searching for on-line shops, comparing products and their prices, composing a week program for film, music, television or radio on the internet, taking into account, on one hand, the taste of the user and, on the other hand, the connection speed of the user.

Finally, the user can be served in his/her own language, with or without simultaneous translation.

BRIEF DESCRIPTION OF THE DRAWINGS

With the intention of better showing the characteristics of the invention, hereafter, as an example without any limitative character, a preferred embodiment of a method according to the invention is described, with reference to the drawings, wherein.

DESCRIPTION OF PREFERRED EMBODIMENTS

Figure 1:
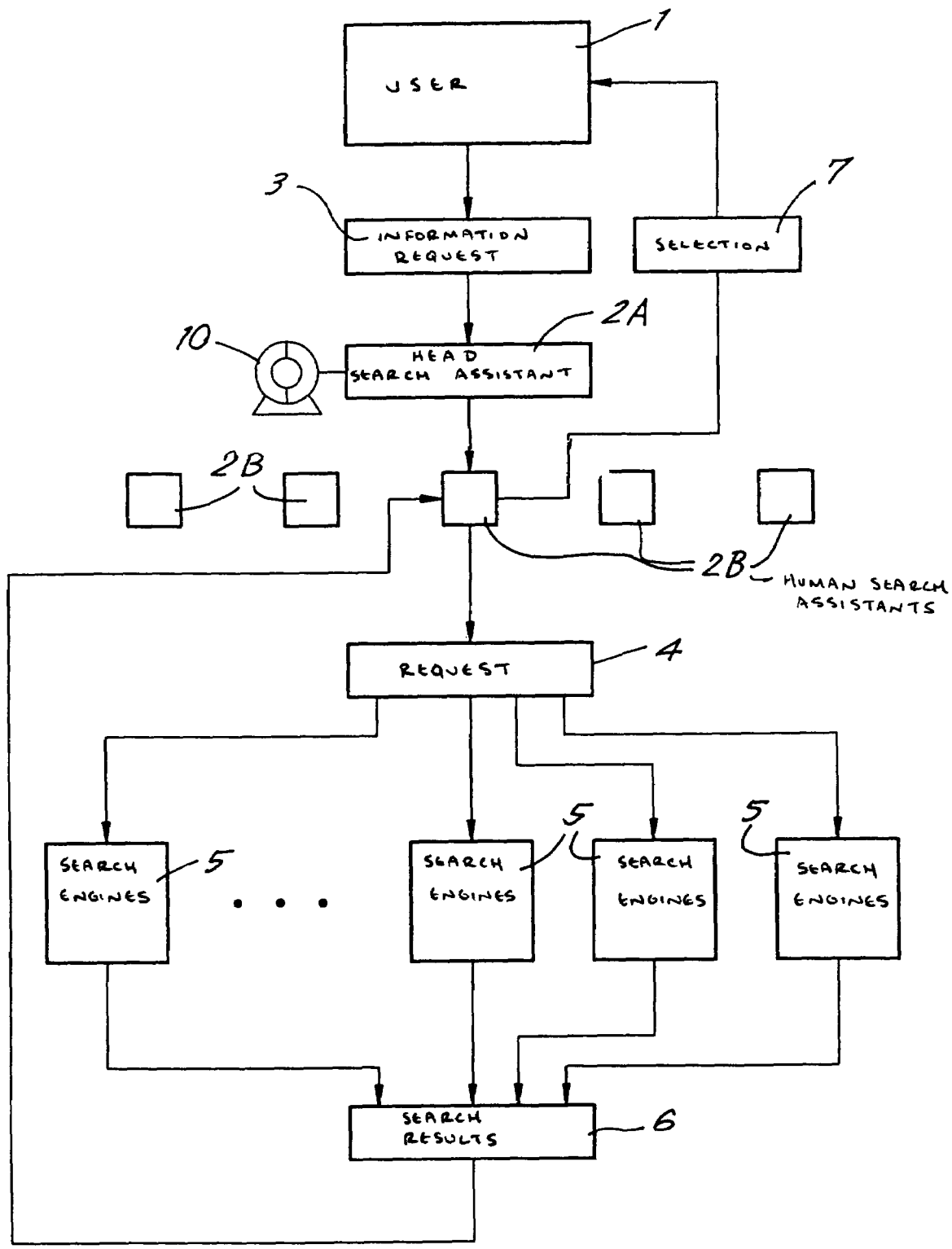
FIG. 1 represents a flow diagram of the method according to the invention.

As represented in FIG. 1, a user 1 who is searching for information in respect to a certain topic, contacts, for example, by means of a personal computer, by means of the internet, the site from where a number of human search assistants 2 are operating.

This group of human search assistants 2 consists of one or more head search assistants 2A having below them a number of specialized adjunct search assistants 2B who each are specialized in a certain field, for example, sports, the stock exchange, the weather and so on.

The communication with the head search assistant 2A and the specialized human search assistants 2B is in real time and interactive and can take place in the user's 1 own language.

The head assistant 2A may be reached at a portal site, but in fact he may be working at home or in an office. Also the adjunct assistants 2B may work at home or in offices at different locations.

The user 1 submits his information request 3 to the head search assistant 2A, which can take place, for example, by means of voice recognition technology (with or without SOFIA).

There may be a waiting time, for instance 1 minute, during which publicity can be shown.

If necessary, the head search assistant 2A discusses the information request 3 with the user 1 in order to get a picture of the posed problems, and subsequently he directs the information request 3 towards the most suited specialized adjunct search assistant 2B.

There may be a real-time translation of the language of the user 1, and the head search assistant 2A may select the communication language from, for instance, the following languages: English, Chinese, Japanese, Arabian, Spanish, French, German and Russian and chose an adjunct search assistant in function of the language of the user, so that further translation is no longer required.

If necessary, the chosen adjunct search assistant 2B further discusses the information request 3 with the user 1 in order to get a picture of the request and reformulates the information request 3 into an adapted request 4 which is more precise.

If there is a choice, the user 1 possibly may choose with which head search assistant 2A and/or specialized adjunct search assistant 2B he wants to communicate.

This is also valid when there is no classification into head search assistant 2A and specialized adjunct search assistants 2B.

After some requests from a user, this choice can be performed automatically, for example, in that the user 1 is recognized by means of voice recognition, iris recognition or fingerprint recognition, and, by means of this recognition, always is connected to the same web librarian 2, 2A or 2B.

This recognition and, thus, identification of the user having a request may also be used to check whether the user has a subscription, or to permit payment of the assistance by credit card or bank card or by a pre-paid subscription.

By means of a digital web camera 10, the human search assistant 2, 2A or 2B is visualized on line at the user's 1. The user 1 may possibly also receive on his display the image of the screen of the search assistant 2, 2A or 2B instead of or together with the image of the assistant.

In the example represented in FIG. 1, the adapted request 4 is put by the specialized human search assistant 2B into different search engines 5 he has at his disposal.

Due to his expertise, the specialized human search assistant 2B has a good knowledge of the internet and already knows from the start where he must go looking for the information, which considerably shortens the search time, as opposed to a search engine 5 which does not have the possibility of a directed search. As a consequence, the human search assistant 2B considerably increases the chances of obtaining good results.

After having received the search results 6 of the search engines 5, the specialized human search assistant 2B performs a selection 7 of said search results 6 on the basis of the relevance, related to the request 4. Subsequently, this selection 7 is offered to the user 1.

The request of the user 1 and the response of the search assistant 2B are preferably recorded in a data base. This data base can be used as a marketing tool. Others may have access to this data base against payment of a fee.

The result of the search possibly may be confirmed by email.

The head search assistant or one or more of the adjunct search assistants may have such an experience in searching on the internet that he may be called a web librarian whose assistance is not limited to designating the place where the requested information may be found. This web librarian is able to give additional information and to supervise the user in his search on internet. Due to his expertise, he may find the relevant search robot more easily or quickly. Even the use of search engines is not always necessary.

Due to his expertise in his search domain, a specialized adjunct search assistant 2B is familiar with the terminology to be used and perfectly understands the request.

Thereby, not only his expertise in searching is useful, but also his expertise in a particular domain, for example, on tax laws in a certain country, on certain diseases, on certain sports, certain musical genres, such as Jamaican samba, etc.

He can not only perform all the searching on his own, but also can assist the user 1. Hereby, he indicates the place where the user 1 has the greatest possibility of finding the information and formulates useful tips for calling up this information fast and efficiently.

This search assistant may have access to data bases which are only accessible for authorized persons, by using a password, and may, if information for the user can be found in such data base, explain to the user how to gain access to such data bases.

The web librarian, who, in the represented example, may be the head web librarian as well as a specialized adjunct web librarian, does not only assist the user 1 when searching for information, but also when searching for services, such as on-line shopping, price and product comparison.

Further, this web librarian can compose programs for the user 1 consisting of films, music, television or radio programs which are provided via the internet.

Figure 2:
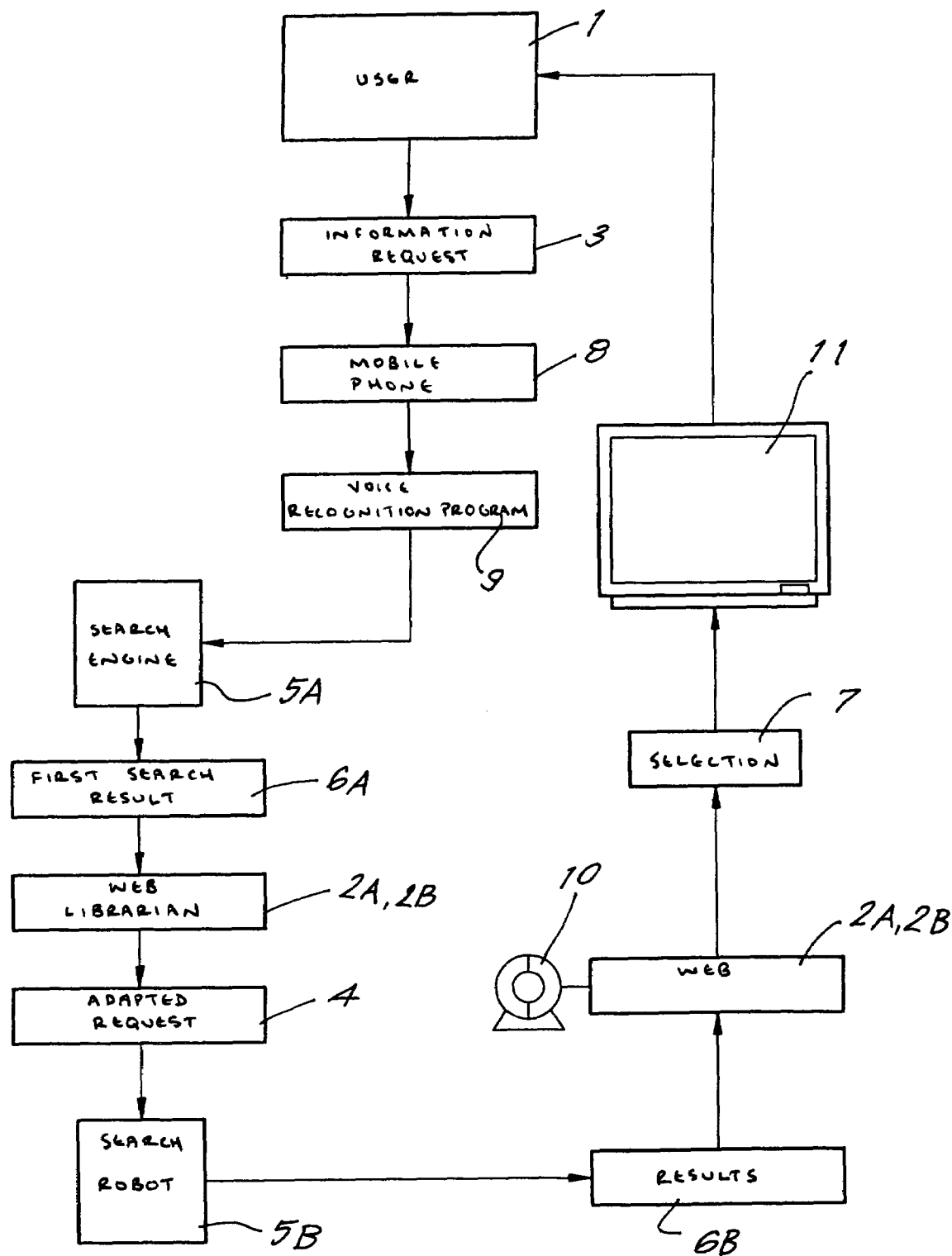
FIG. 2 represents a flow diagram similar to that of FIG. 1, however, in which speech transfer is applied.

As represented in FIG. 2, the user 1, by means of a mobile phone 8 of the second generation (GPRS) or of the third generation (called UMTS, buth with suitable standards for countries such as the USA, India, China, Japan), verbally puts an information request 3 to a first search engine 5A, whereby a voice recognition program 9 translates the request 3. Subsequently, the result of the search action performed by the search engine 5A is submitted to the web librarian 2, either the head web librarian 2A or a specialized web librarian 2B.

On the basis of the first search result 6A of the search robot 5A, the information request 3 can be re-formulated into an adapted request 4 which is offered to the same search engine 5 or series of search engines (with improved inquiry) or to a second search robot 5B or series of search robots 5B, which leads to a series of results 6B. After an validation of the results 6B, the selection 7 is submitted by the web librarian 2, 2A, 2B, whereby this latter, by means of a web camera 10, is visualized on a television apparatus 11 at the user's 1.

Figure 3:
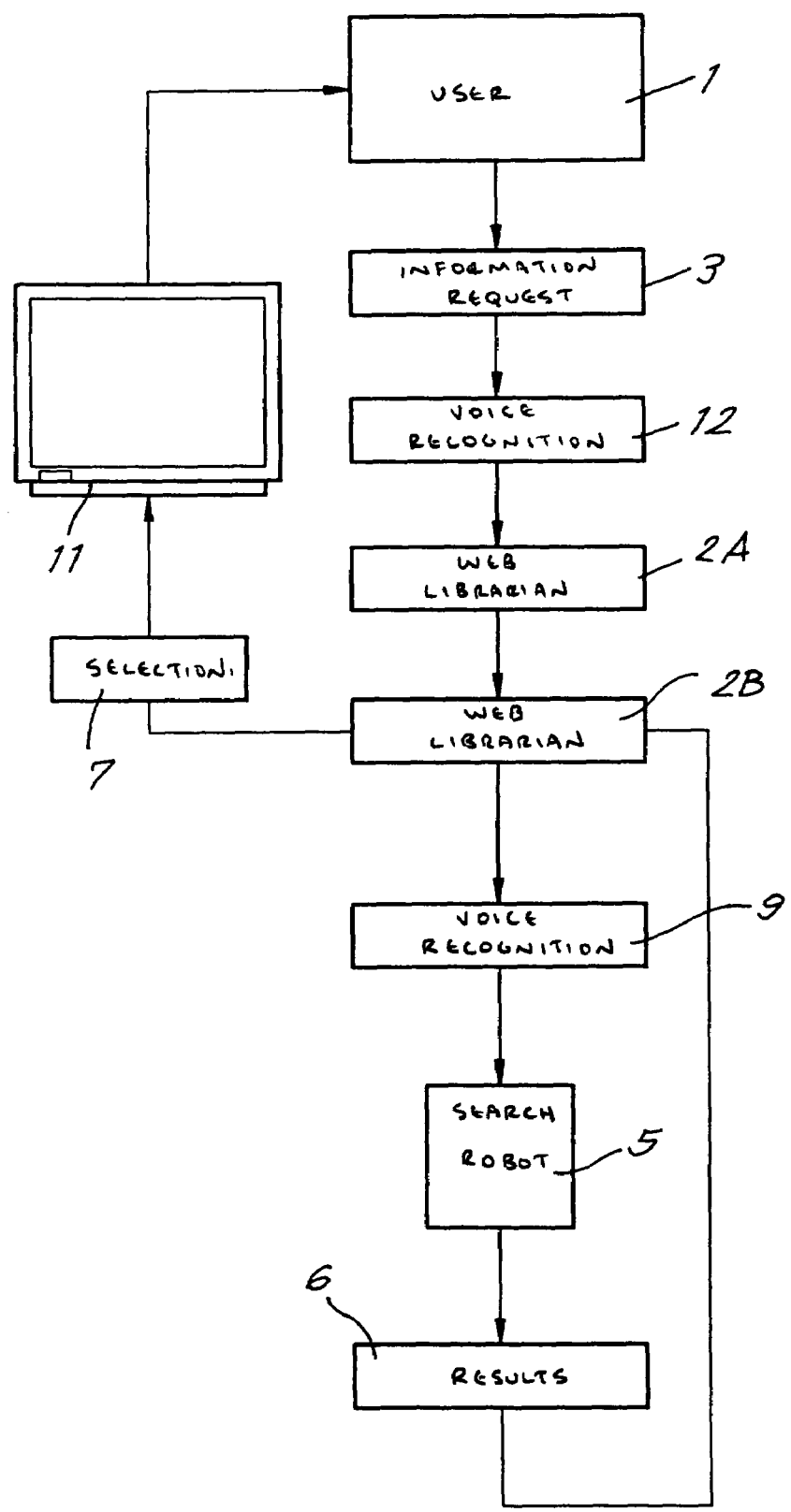
FIG. 3 represents a flow diagram similar to that of FIG. 2, however, whereby voice recognition (with or without SOFIA or sophisticated intelligent agents) is applied.

In an embodiment variant represented in FIG. 3, as already mentioned before, use is made of voice recognition with or without use of SOFIA (sophisticated intelligent agents). In this case, by means of voice recognition 12 the head web librarian 2A is contacted, who submits the information request 3, posed by the user 1, to a specialized web librarian 2B who, by means of a voice recognition program 9 with or without use of SOFIA (sophisticated intelligent agents), activates a search robot 5.

It is also possible that the adjunct web librarian or adjunct specialized human search assistant is activated by voice recognition.

Subsequently, the search results 6 are summarized in a selection 7 and offered to the user 1.

Figure 4:
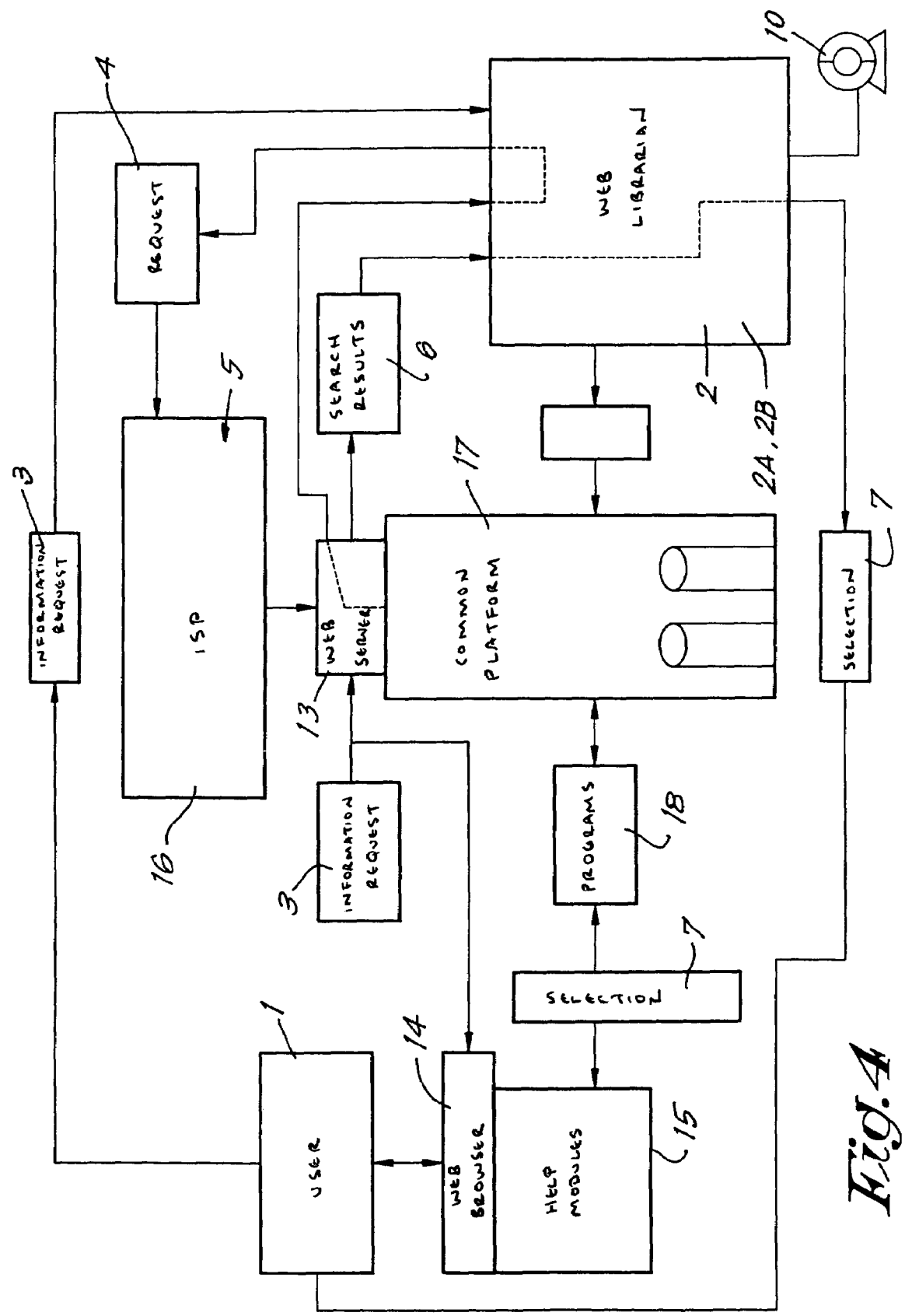
FIG. 4 represents a flow diagram of a method of realization in accordance of which the invention is applied.

In FIG. 4, a method of realization of the invention is represented in a more detailed manner. The user 1 makes a connection to a web server 13, by means of a so-called web browser 14 which is provided with a number of help modules 15, or plug-ins. Via the web browser 14, the information request 3, by means of the web server 13, is submitted to the web librarian 2.

As before, the information request 3 is re-formulated in an adapted request 4 which is put through to an Internet Service Provider or ISP 16 having a number of search robots 5 at his disposal. By means of the web server 13, said ISP 16 communicates his search results 6 to the web librarian 2, whereby this latter then offers the user 1 a selection 7 from the search results 6.

By means of a common platform 17 shared by the web server 13 and the web librarian 2, various services, such as comparisons of prices and products, can be offered to the user 1.

By means of this common platform 17, also programs 18, with films, music, television or radio, are composed for the user 1 by the web librarian 2. Said programs 18 may be viewed and/or listened to by means of the help modules 15.

Figure 5:
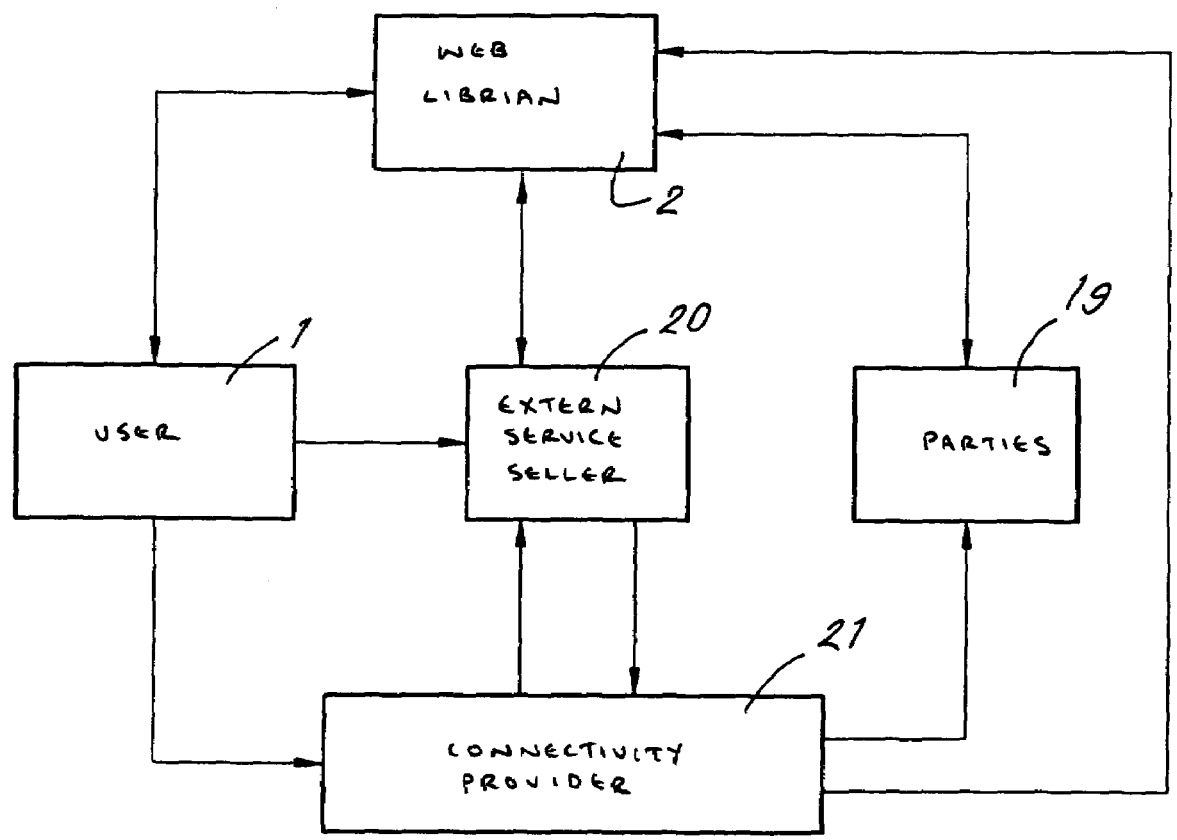
FIG. 5 represents a flow diagram of a method of realization of the invention according to TINA.

As represented in FIG. 5, all services offered by the web librarian 2 can be provided by independent parties. The web librarian 2 can recur to a so-called service provider 19 for the intermediary of search robots 5 and to an extern service seller 20 for providing the services requested by the user 1. By means of a connectivity provider 21, this user 1 can communicate with the remaining parties 2, 19 and 20 in different ways.

The web librarians 2 may give suggestions to the service providers for better presentation and access of some of their clients and websites, so that the access to the search engines is improved.

It is important to notice that a head or adjunct web librarian 2 may transmit the request of the user 1 to another web librarian or search assistant who is more competent or has more experience in the subject-matter of the request. Adjunct web librarians may form a complete network located over the whole world, said network may be managed by one or more head librarians or head search assistants.

The web librarian or search assistant may also request help of other persons than search assistants of the network, for instance, a professor of a university.

Figure 6:
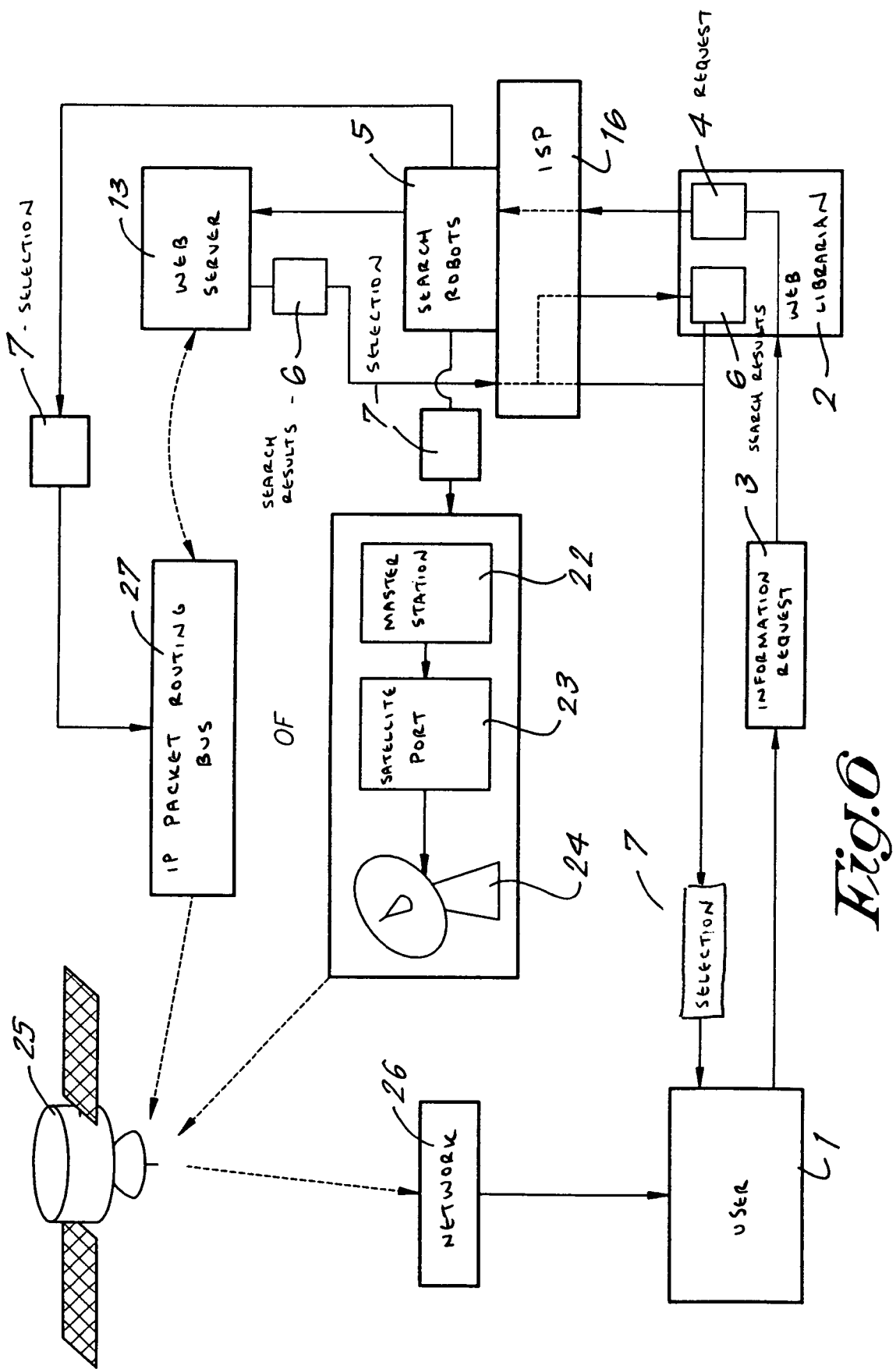
FIG. 6 represents a flow diagram of a method of realization of the invention by means of a satellite network IDBS.

The user 1 may recieve his response from the web librarian 2 via a satellite network, such as represented in FIG. 6. This can in the first place be useful for receiving complex or large data flows, such as, for example, radio or television programs composed by the web librarian 2.

The user 1 submits his information request 3 to the web librarian 2 via the internet, after which an adapted request 4 is transmitted to an Internet Service Provider 16 which activates the search robots 5.

Via a web server 13, the search results 6 are made known to the Internet Service Provider 16 which can transmit these in the form of a selection 7, either in the usual manner via the internet, whether or not via the web librarian 2, or via satellite communication, Hertz connections or other terrestrial communication.

With satellite communication, the selection 7 either is transmitted via a master station 22 by means of a satellite port 23 through a disk antenna 24 towards a satellite 25, which in its turn transmits the selection 7 via an UDP/IP network 26 towards the user 1, or is transmitted via an IP Packet Routing Bus 27 towards the satellite 25, which, in the same manner as heretofore, transmits the selection 7 further towards the user 1.

Figure 7:
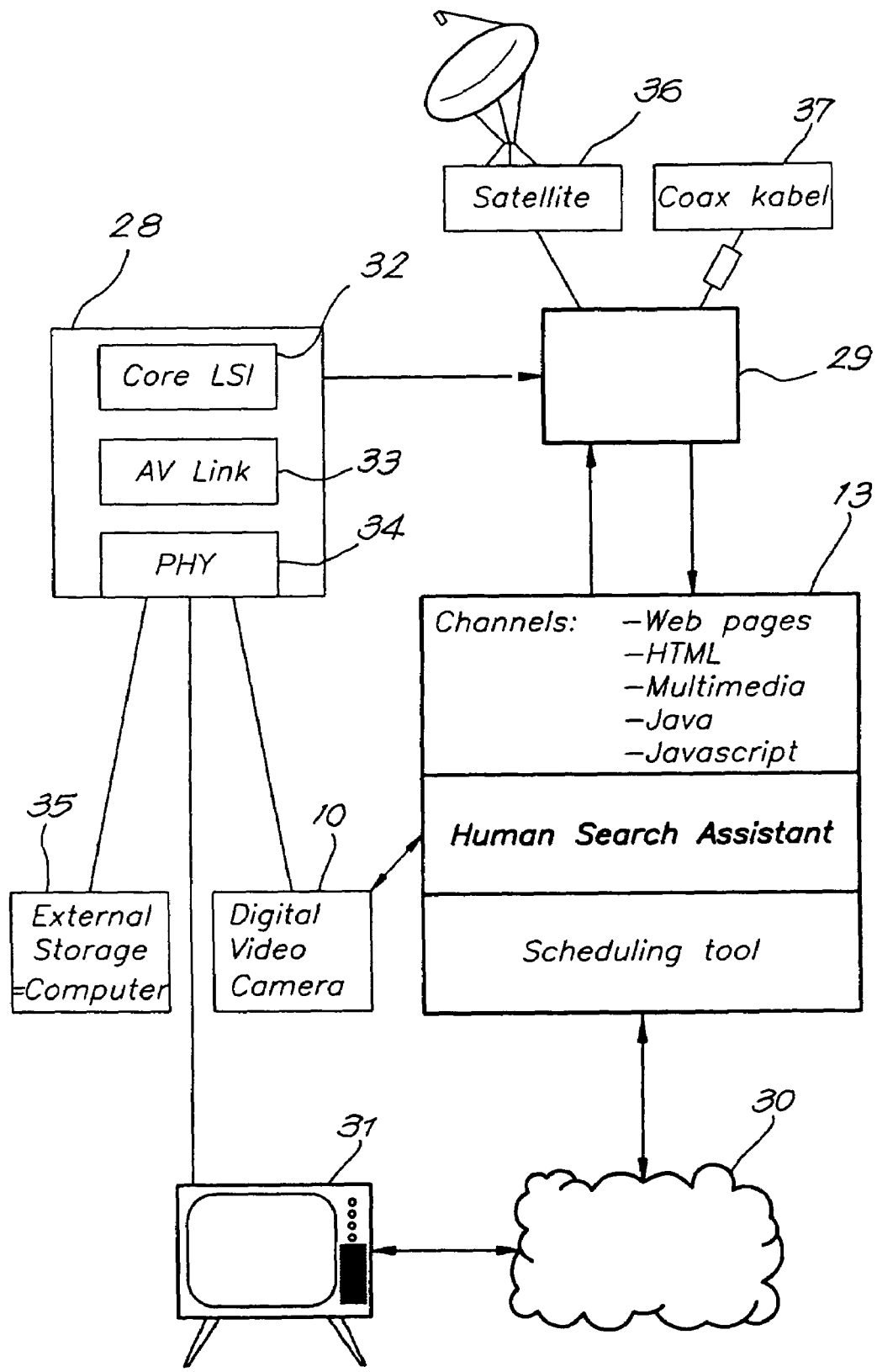
FIG. 7 represents a flow diagram of another embodiment of the process according to the invention.

The user 1 may also file his request for search assistance by the intermediary of active television. As shown schematically in FIG. 7, a webcasting client enters his request in the set-top box 28. The request is transmitted through the channel transmitter 29 to a web server 13 connected to the internet 30. The set-top box 28 is associated with a television apparatus 31 connected to the internet 30. Description standards or programming techniques such as web pages, HTML (Hypertext Mark-up Language), Multimedia, Java and Java Script may be used. The set-top box may be controlled by human voice.

The web librarians 2 may transmit films, television programs and music from data bases to the television apparatus 30. In a future, instead of a television apparatus, a mobile phone of the third generation may be used (UMTS standard or similar with MPEG2 or MPEG4 or MPEG7 or MHP level 3 or MHEG5).

The set-up box comprises a core LSI 32, an AV link 33 and a PHY (physical layer) 34. The high-end AV link 33 uPD72891 (with DTCP) and uPD72893 come with the worldwide integration of a digital video codec which enables the AV link 33 to process digital video streams recorded with a digital video camera, while the digital video codec is sent via IEEE 1394 in a common REC 656 signal that is streamed into a set-up box core LSI 32. This AV link 33 (interface 61883) supports full-duplex transmission and formats like DVB, DSS and DVCR as well as AV commands to control devices via IEEE1394 which can be executed via UART or by a parallel host interface. The set-up box 28 is linked with a computer 35 with external storage by the physical layer 34. The digital video camera 10 is linked with the human search assistant 2. The channel transmitter 29 can be linked by satellite 36 or bi-directional hybrid fibre coax 37 with the AD9873 mixed-signal front-end for set-top boxes 28 and cable modems.

The human search assistant 2 may be contacted through an output RS 232, USB, modem, TV-Video, IEEE 1394, IEEE 1394-1995 and IEEE 1394-2000a specifications and interoperable with iLink and Firewire devices, or a digital device such as a computer, a set-top box and a mobile phone.

If several search assistants 2A, 2B are used, there may be a division in information fields. Said fields appear on the display of the user when he makes a connection with the head search assistant 2A and may click the corresponding field, so that the head search assistant 2A may more easily route the request to an adjunct search assistant 2B, or possibly to connect the user 1 directly to this adjunct search assistant 2B.

It is evident that the present invention is in no way limited to the form of embodiment described heretofore, on the contrary may such method be realized in various variants without leaving the scope of the invention.

The invention claimed is:

1. A method for searching information on the Internet, comprising the steps of:
    providing a computer linked to the Internet;
        accessing directly at least one search assistant by a user via a web browser on the computer linked to the Internet to search for information on the Internet, wherein the at least one search assistant is human and a specialist in searching on the Internet;
        conducting a dialogue between the user with the at least one human search assistant over the Internet and in real time to formulate a first information request; and
        transmitting the first information request over the Internet to the at least one human search assistant;
        wherein the at least one human search assistant includes one or more head human search assistants, the one or more head search assistants having below them a number of specialized adjunct human search assistants who each is specialized in one or more fields;
        directing the first information request to an appropriate one of the specialized adjunct human search assistants via Internet, said directing is based on the one or more head human search assistants;
        reformulating the first information request into an adapted information request associated with the first information request, said reformulating is based on the one of the specialized adjunct human search assistants and said conducting;
        applying the adapted information request on at least one search robot for accessing information on the Internet related to the first information request by the at least one human search assistant, the adapted information request being placed through an Internet Service Provider;
        communicating search results obtained by the at least one search robot to the at least one human search assistant via a web browser, said communicating is based on the Internet Service Provider; and
        offering a user a selection of the search results in order for the user to make a first information selection based on the first information request displayed via the web browser, said offering is based on the at least one human search assistant.

2. The method of claim 1, wherein the at least one human search assistant assists the user by searching on the Internet and indicates to the user where the information the user is looking for can be found on the World Wide Web or where the user should be looking on the World Wide Web or giving the user information found on the World Wide Web.

3. The method of claim 1, wherein the at least one human search assistant has such expertise in searching on the Internet that the at least one human search assistant can be considered a web librarian and is able to give more information than a place to look on the World Wide Web and is able to supervise the user in consulting the Internet.

4. The method of claim 1, wherein the at least one human search assistant makes use of search engines for searching on the Internet.

5. The method of claim 1, further comprising the step of using voice recognition via the Internet to carry out the user's communication with the at least one human search assistant.

6. The method of claim 1, further comprising the step of offering the user a visual representation of the at least one human search assistant.

7. The method of claim 1, further comprising the step of consulting the at least one human search assistant via a device additional to the computer and selected from the group consisting of: a mobile phone, a palmtop, an interactive television apparatus and a set-top box associated therewith.

8. The method of claim 1, further comprising the step of enabling additional contact of a same search assistant by the user by means of voice recognition, iris recognition or fingerprint recognition.

9. The method of claim 1, wherein the at least one human search assistant assists the user when searching for services.

10. The method of claim 9, wherein said services comprise on-line shopping, price and product comparison.

11. The method of claim 1, wherein the at least one human search assistant composes programs for the user comprising films, television or radio or music programs which are provided via the Internet.

12. The method of claim 1, further comprising the step of communicating with the user in the user's own language, with or without simultaneous translation.

* * * * *